J. SCHNEIDER.
MANUFACTURE OF LAGER BEER.
No. 56,453.                                Patented July 17, 1866.
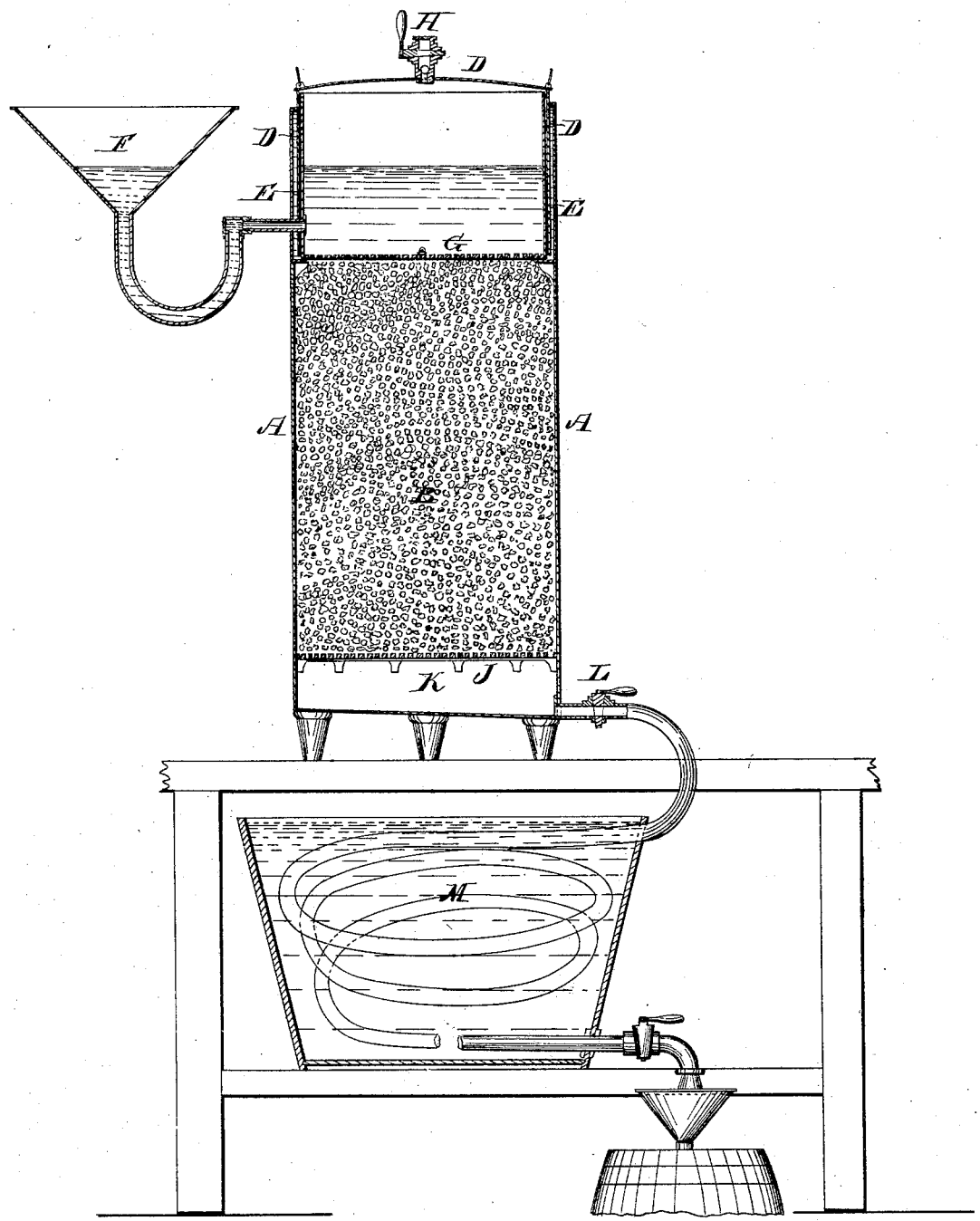
Witnesses:
Gustav Burkenno
Robert B. White
Inventor:
John Schneider

UNITED STATES PATENT OFFICE.

JOHN SCHNEIDER, OF WILLIAMSBURG, NEW YORK.

IMPROVEMENT IN THE MANUFACTURE OF LAGER-BEER.

Specification forming part of Letters Patent No. 56,453, dated July 17, 1866.

*To all whom it may concern:*

Be it known that I, JOHN SCHNEIDER, of Williamsburg, Kings county, and State of New York, have invented a new Manufacture or Process of Making Lager-Beer; and I do hereby declare the same is fully described and represented in the following specification and the accompanying drawing, which represents a sectional view of a hop-extractor or apparatus which I use in connection with other machinery for manufacturing my improved lager-beer.

In the said drawing, A represents a hop-extractor, of which B is the hop-chamber, D the cap or lid, E a receptacle for the flange of the lid D and for a quantity of water or other fluid for the purpose of excluding the air from the body of the hop-extractor. F is a funnel, through which the boiling or unfermented beer is conveyed onto the hops; G, a distributer, through which the wort or boiling beer passes; H, a cock, through which the air may be drawn from the body of the extractor, or may be permitted to enter, as desired; J, the perforated bottom of the hop-chamber; K, the vacuum-chamber; L, a cock in the pipe leading from the same, and M the refrigerator.

I would remark that I do not confine myself to any particular form of apparatus for carrying into practical operation my said invention, provided that the peculiar features thereof be retained.

The nature of my invention consists in placing a quantity of hops in an air-tight vessel and extracting from the same the flavoring principle or lupuline by means of boiling unfermented beer, which I pour onto and filter through the mass of hops and afterward run the liquid through a worm or refrigerator and mix the said extract or essence of hops in due proportions with ordinary lager-beer, whereby I improve the beer in strength and flavor, thus producing lager-beer of superior quality and for seventy-five per cent. of the cost of the best article of the kind in the market, as will be hereinafter explained.

The ordinary way of making lager-beer is to steep or mash the prepared barley or malt in boiling water, and when all the sugar, starch, &c., is extracted the liquor is run off and boiled in suitable coppers or tuns open to the air. The hops required to give the beer flavor and to assist the fermentation of the wort are put in during this process and are boiled with the wort. When sufficiently boiled the wort is run off into vats (also open to the air) to cool, and is then subjected to the process of fermentation in tuns, after which it is put into casks for immediate or future use.

The great defect in this process, so far as the hops are concerned, is that during the operations of boiling and cooling the wort a very large percentage of the flavor of the hops is lost by evaporation; yet it is absolutely necessary that the hops should be put into the beer at the particular stage of the manufacture mentioned; otherwise the liquor would not ferment properly, nor undergo the chemical changes necessary for its conversion into beer.

The manufacturing process by which I produce my improved lager-beer I will explain as follows:

First, I steep my prepared barley or malt in the usual manner in boiling water and extract all the sugar, starch, or nutritious matter from the same, and the liquor holding these substances in solution I run off and boil in suitable coppers or tuns open to the air.

Second, I put into the boiling wort only a moiety of the quantity of hops now used or required for making lager-beer (yet in sufficient quantity to answer the process of fermentation) and boil the wort and hops together in the usual way.

Third, I place a small quantity of hops (varying in proportion, but generally in the ratio of half a pound for every barrel of liquor brewing) in a covered vessel, A, so arranged that the air has no easy access to the hops and can be entirely excluded from the same if desired. A few buckets (or like small quantity, according to the weight of hops used) of boiling wort are then poured into the funnel F attached to said vessel and allowed to flow over the surface of the hops through the distributer G. The wort rapidly filters through the hops and passes downward through a perforated plate or bottom, D, on which they rest, extracting in its passage the whole, or nearly the whole, of the flavoring property contained in the hops. It is then received into the vacuum-chamber K or lower part of said vessel, and thence downward by a pipe into a refrigerator, M. As it passes downward through the pipe it produces a vacuum in the chamber K behind it, and more liquor is thus sucked through the hops B in the vessel A to supply said vacuum. From the refrigerator the liquor issues cold, and may then be added to the beer at any time desired.

Fourth, I now distribute it in any required proportion through the great bulk of the boiled wort from which the small quantity used to extract the hop-flavor was taken, but such addition of the flavor is made after the fermentation of said liquor and when there is no longer any danger of its being lost by exposure to the air.

Furthermore, I use the boiling wort as the solvent to extract the lupuline from the hops, for the reason that it is better adapted than water or steam to effect this object, because of the change in the chemical constituents of the wort brought about by boiling, rendering it thereby isomeric and peculiarly capable of dissolving the lupuline.

The high specific gravity of the wort causes it to boil only at a higher temperature than boiling water, and thus increases its power of dissolving vegetable essences, such as lupuline, and for this reason the conduction of the process in a closed vessel is essential to its success, because of the volatility of the lupuline.

From the above it will be seen that the manufacture or process of making my lager-beer is not only simple, but convenient; that the beer produced is not liable to sour, but is substantial, well-flavored, and possesses the tonic properties of the hops, rendering it as a healthy and palatable beverage superior to any lager-beer hitherto introduced in the market, and can be manufactured at seventy-five per cent. of the cost of the same.

What I claim, and desire to secure by Letters Patent, is—

1. The above-described process and production of an improved lager-beer, substantially as described and set forth.

2. The peculiar manner of extracting the essence or flavor of hops by means of the boiling wort or unfermented beer and mixing the same with the fermented beer, for the purposes substantially as set forth and described.

In testimony whereof I have hereunto set my signature.

JOHN SCHNEIDER.

Witnesses:
    H. J. RAMSDELL,
    A. NEILE.